United States Patent [19]
Campbell et al.

[11] Patent Number: 4,883,149
[45] Date of Patent: Nov. 28, 1989

[54] VEHICLE DISC BRAKES OF THE LIQUID COOLED TYPE

[75] Inventors: Roy Campbell, Worcestershire, England; Anthony G. Price; Andrew P. Green, both of Gwent, Wales

[73] Assignee: Lucas Industries public limited company, Birmingham, England

[21] Appl. No.: 225,185

[22] Filed: Jul. 28, 1988

[30] Foreign Application Priority Data

Jul. 28, 1987 [GB] United Kingdom ................. 8717877

[51] Int. Cl.⁴ ...................... F16D 65/78; F16D 55/02; F16D 13/72; F16D 13/74
[52] U.S. Cl. ..................... 188/264 E; 188/71.6; 188/264 D; 188/264 C C; 188/264 B; 192/107 C; 192/113 B
[58] Field of Search .................. 188/264 P, 264 C C, 188/264 E, 264 F, 264 D, 264 B, 71.6; 192/113 B, 107 C

[56] References Cited

U.S. PATENT DOCUMENTS

| | | | |
|---|---|---|---|
| 1,929,716 | 10/1933 | Spase | 192/107 C |
| 1,992,626 | 2/1935 | Nutt | 192/107 C P |
| 2,727,594 | 12/1955 | Ganster, Jr. | 188/264 E |
| 3,303,911 | 2/1967 | Hause et al. | 188/264 P |
| 3,534,842 | 10/1970 | Davidson, Jr. | 192/113 B |
| 4,011,930 | 3/1977 | Coons et al. | 188/264 E X |
| 4,013,148 | 3/1977 | Kobelt | 192/113 B X |
| 4,313,533 | 2/1982 | Aschauer | 192/113 B |
| 4,629,650 | 12/1986 | Valier | 188/264 B X |

FOREIGN PATENT DOCUMENTS

0701725 12/1953 United Kingdom ........... 188/264 E
0739244 10/1955 United Kingdom ........... 188/264 E Primary Examiner—Andres Kashnikow
Assistant Examiner—Richard Potosnak
Attorney, Agent, or Firm—Oldham & Oldham

[57] ABSTRACT

A braking member for a brake of the liquid cooled type is provided on at least one side with an annular reservoir for cooling liquid, and passages are arranged to control the release of liquid from the reservoir to braking surfaces in response to centrifugal force.

21 Claims, 8 Drawing Sheets

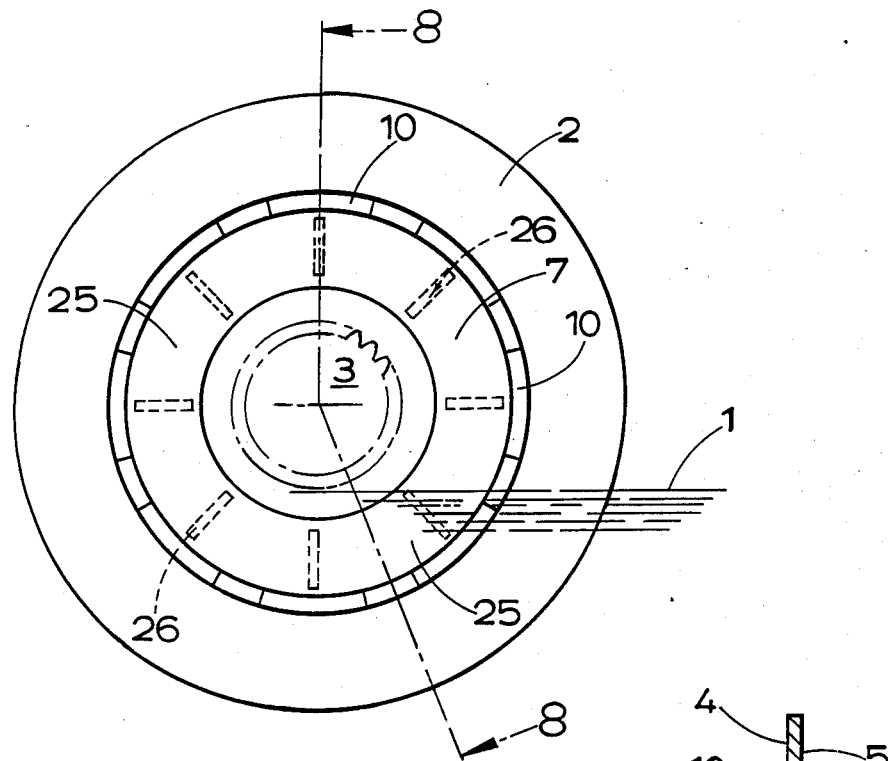
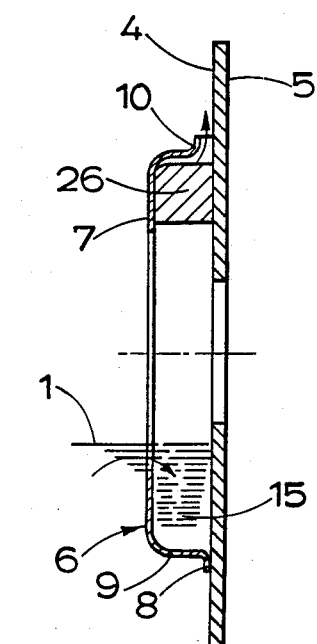
FIG.7
FIG.8

VEHICLE DISC BRAKES OF THE LIQUID COOLED TYPE

This invention relates to improvements in vehicle disc brakes of the liquid-cooled type, of the kind in which at least one rotatable friction braking member keyed to a shaft to be braked and having a braking surface is rotatable in a housing containing a cooling liquid for cooling the braking member, and the braking member is adapted to co-operate with a relatively stationary braking surface to apply the brake.

Brakes of the kind set forth are commonly used in tractors or the like vehicles, and the cooling liquid usually comprises oil from the gearbox. In order to minimise parasitic drag, particularly when the oil is cool, and conserve consequent power, it is usual for the oil in the gearbox to be maintained substantially at the minimum level only necessary to provide adequate lubrication. This, in turn, creates the problem that such a minimum level represents a volume of oil which is normally inadequate to achieve a degree of cooling of the braking member necessary to sustain a minimum wear life for the lining.

We are aware of U.S. Pat. No. 3,124,216 which discloses a disc brake of the kind set forth in which each of a pair of complementary disc members or pressure plates are provided with internal annular reservoirs through which cooling liquid is circulated. The reservoirs are completely sealed, both within the disc members or pressure plates, and from co-operating braking surfaces of the brake.

According to our invention, in a disc brake of the kind set forth the braking member is provided on at least one side with an annular reservoir for cooling liquid, and passage means are arranged to control the release of liquid from the reservoir to the braking surfaces in response to centrifugal force.

The reservoir stores the cooling liquid for supply to the braking surfaces, and the cooling liquid is conserved by arranging for the passage means to release the liquid only at a rate sufficient to affect adequate cooling of the braking surfaces for a given volume of available cooling liquid.

Preferably the reservoir is defined between the braking member and an annular wall which is secured to, or otherwise integral with, the braking member at least at the radially innermost end of the wall.

The reservoir is adapted to receive cooling liquid, for example by means of a gravity feed, by a means of a pump separate from the braking member, or by means of an impeller constituted at least in part by the braking member itself.

The reservoir may have an open mouth at its innermost end, which is particularly suitable for receiving cooling liquid by gravity feed or from a pump separate from the braking member.

When the impeller is constituted by a part of the braking member, the reservoir may be closed at its innermost end and may receive liquid from the impeller through transfer openings in the braking member itself.

The passage means may comprise angularly spaced exit slots at the radially outermost end of the reservoir.

The slots may be disposed in the wall adjacent to the friction member, or the slots may be provided in the thickness of the material of the friction member itself with the inner ends of the slots extending into the projected area of the reservoir.

The reservoir may be provided with angularly spaced baffles which act to raise liquid into the reservoir from a sump and/or restrict movement of liquid in the reservoir in circumferential direction.

The baffles may extend between the braking member and the wall, and they may be straight.

Some embodiments of our invention are illustrated in the accompanying drawings in which:

FIG. 7 is an end view of yet another friction braking member;

FIG. 8 is a section on the line 8—8 of FIG. 7;

Figure 1:
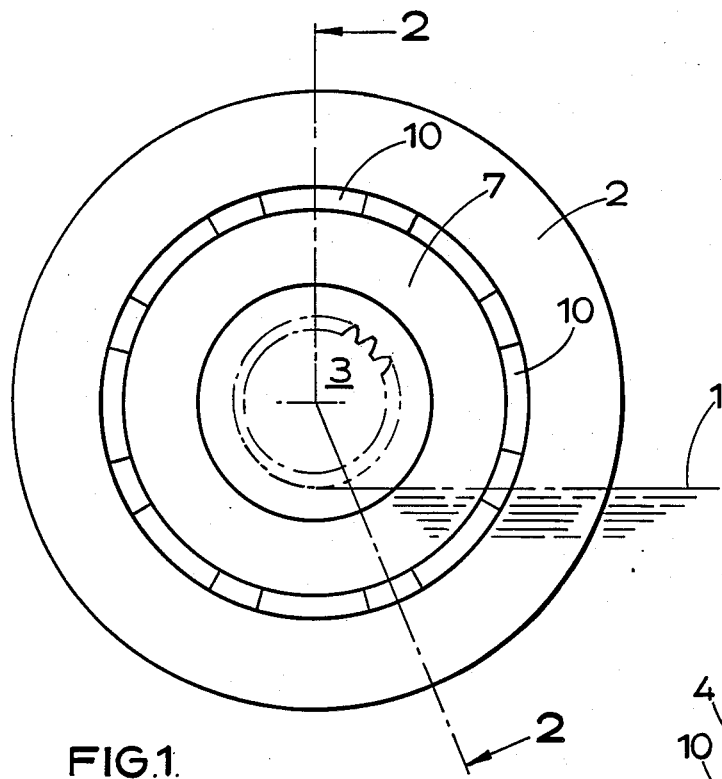
FIG. 1 is an end view of a friction braking member for a disc brake of the liquid-cooled type.
Figure 2:
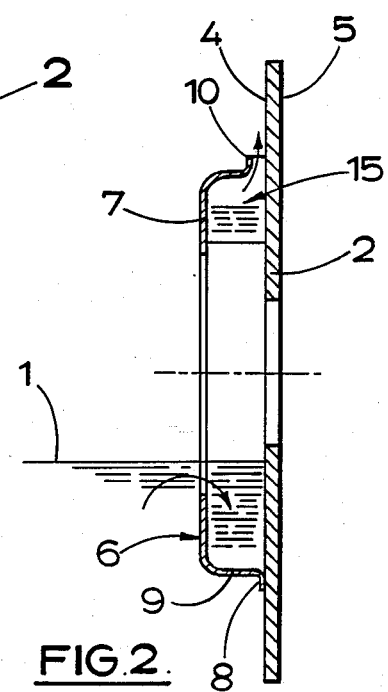
FIG. 2 is a section on the line 2—2 of FIG. 1.

The friction braking member illustrated in FIGS. 1 and 2 of the accompanying drawings is adapted for use in a brake of the liquid cooled-type having a sump filled with cooling liquid, constituted by oil, to a depth 1 as shown. The friction member comprises a planar metal disc 2 of annular outline which is slidably splined for axial sliding movement on a shaft 3 which extends axially through a housing (not shown). The housing defines the sump. Annular braking surfaces 4, 5 are defined by portions of opposite faces of the disc which terminate at the peripheral edge of the disc. The braking surfaces 4, 5 may carry annular linings of friction material.

A wall 6 of dish-shaped outline is mounted on one side of the disc. The wall 6 comprises oppositely directed inner and outer annular flanges 7 and 8 which are interconnected by an circumferentially extending rim 9. The inner flange 7 is of greater radial length than the outer flange 8, and the outer flange 8 is secured to the disc with its outer peripheral edge disposed inwardly of the braking surface 4. The flange 8 and the rim 9 are perforated and/or otherwise deformed to define a plurality of angularly spaced exit ports 10.

When the braking member is installed in the housing, it is positioned between members which are provided with braking surfaces similar to the surfaces 4 and 5, and with which the surfaces 4 and 5 are adapted to co-operate. For example, when the braking member is incorporated in brake of the self-energising spreading type, for example as disclosed in G.B. No. 2 141 193, it may be disposed between the actuating mechanism and a face constituted by one end of the housing.

The annular space between the wall 6 and the disc 2 defines a reservoir 15 for cooling liquid. When the disc rotates, the liquid is forced outwardly centrifugally through the exit ports 10 and over the adjacent braking surface 4. The liquid is progressively released from the reservoir during each revolution of the disc.

Figure 4:
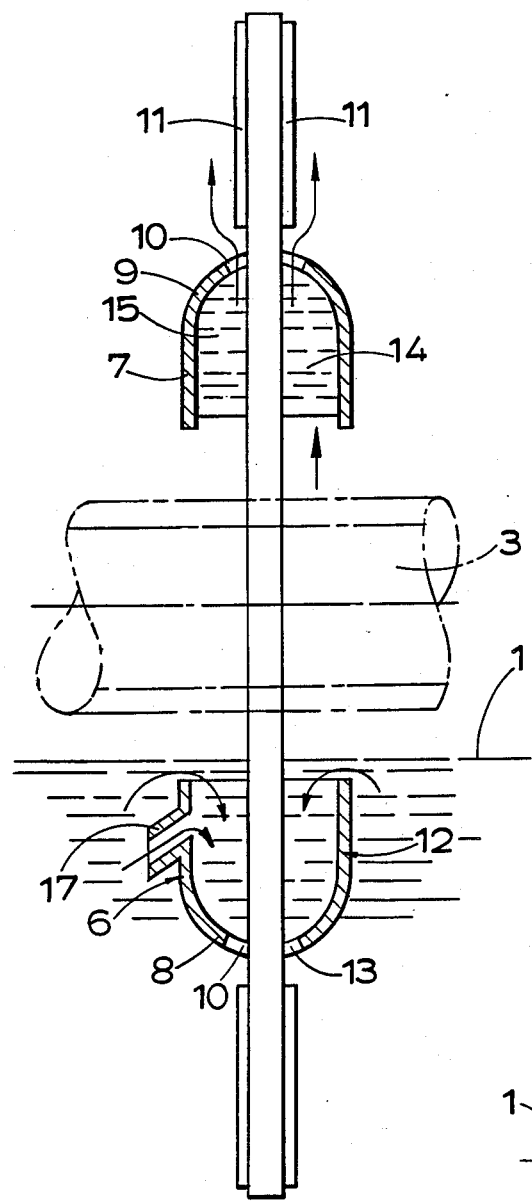
FIG. 4 is a section on the line 4—4 of FIG. 3.
Figure 3:
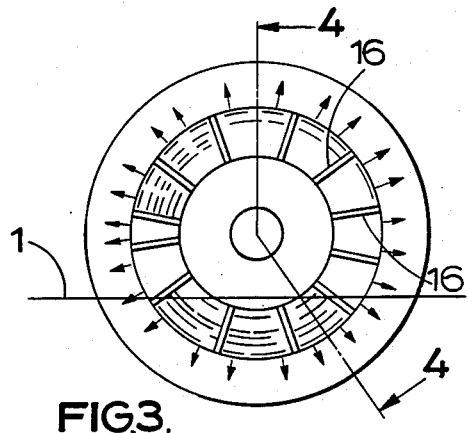
FIG. 3 is an end view of another friction braking member.

In the friction braking member illustrated in FIGS. 3 and 4 of the drawings, the braking surfaces 4 and 5 carry annular linings 11 of friction material, and a wall 12 similar to the wall 6 is mounted on the opposite side of the disc to constitute a second reservoir 14, with the wall 12 also provided with a plurality of annularly spaced exit ports 13. Thus, upon rotation of the discs, cooling liquid is supplied to both friction linings 11.

Each reservoir 14, 15 may be provided with a plurality of angularly spaced baffles 16 to facilitate the transfer of liquid from the sump and into each reservoir.

In addition at least the wall 6 may be provided with a plurality of angularly spaced impellers 17 through which liquid is drawn into the reservoir 15 upon rotation of the disc.

The construction and operation of the disc of FIGS. 3 and 4 is otherwise the same as that of FIGS. 1 and 2, and corresponding reference numerals have been applied to corresponding parts.

Figure 5:
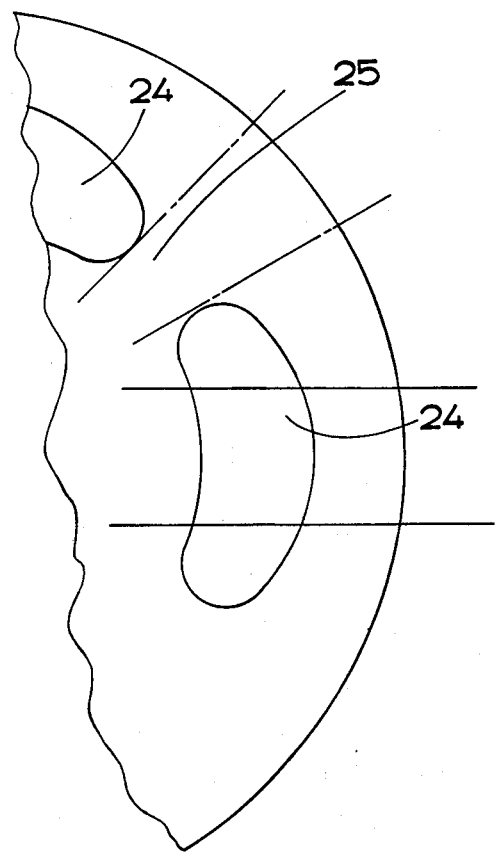
FIG. 5 is an end view of a portion of another friction braking member.
Figure 6:
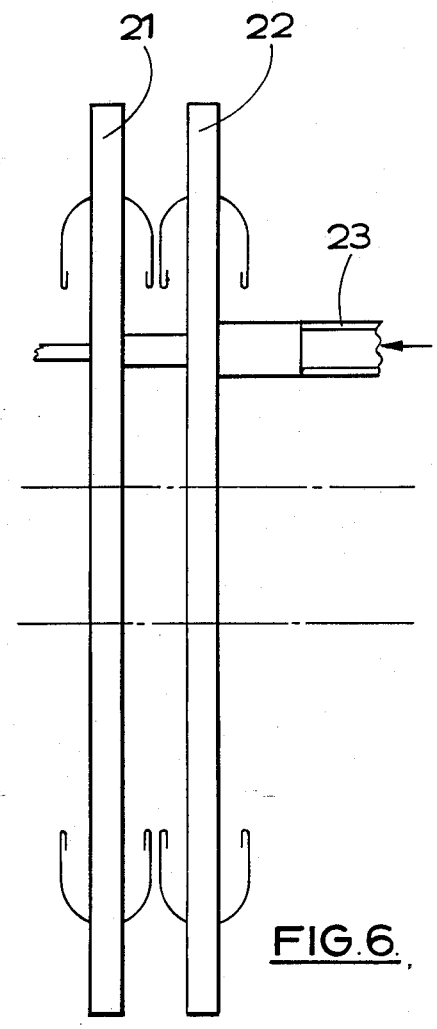
FIG. 6 is a side elevation of two friction braking members, each as shown in FIG. 5.

As shown schematically in FIGS. 5 and 6, the cooling liquid may be supplied to a pair of discs 21, 22 each similar in construction to the disc of FIGS. 3 and 4.

In this construction cooling liquid is discharged through the discs from a jet 23. The discs 21, 22 are provided with a plurality of angularly spaced, circumferentially extending, slots 24, with lands 25 defined between adjacent pairs of slots 24.

When the discs are arranged in side-by-side relationship in a stack, such as in a disc brake of the multi-plate type, the discs utilise graduated slot: land ratios to allow interrupted liquid jet flow. This, therefore, controls the distribution of liquid across the stack to provided substantially even cooling effects.

We arrange for the resistance to flow to increase relatively across the stack with respect to the jet 23. Specifically this is achieved by reducing the arcuate lengths of the slots with consequent increase in the widths of the lands in respect of the discs positioned relatively further from the jet 23.

The friction disc illustrated in FIGS. 7 and 8 of the accompanying drawings is similar to that of FIGS. 1 and 2, and corresponding reference numerals have been applied to corresponding parts.

In this construction, however, the reservoir 15 is sub-divided interiorly into a plurality of angularly spaced chambers 25 of segmental outline by means of eight angularly spaced, straight, baffles 26.

Figure 9:
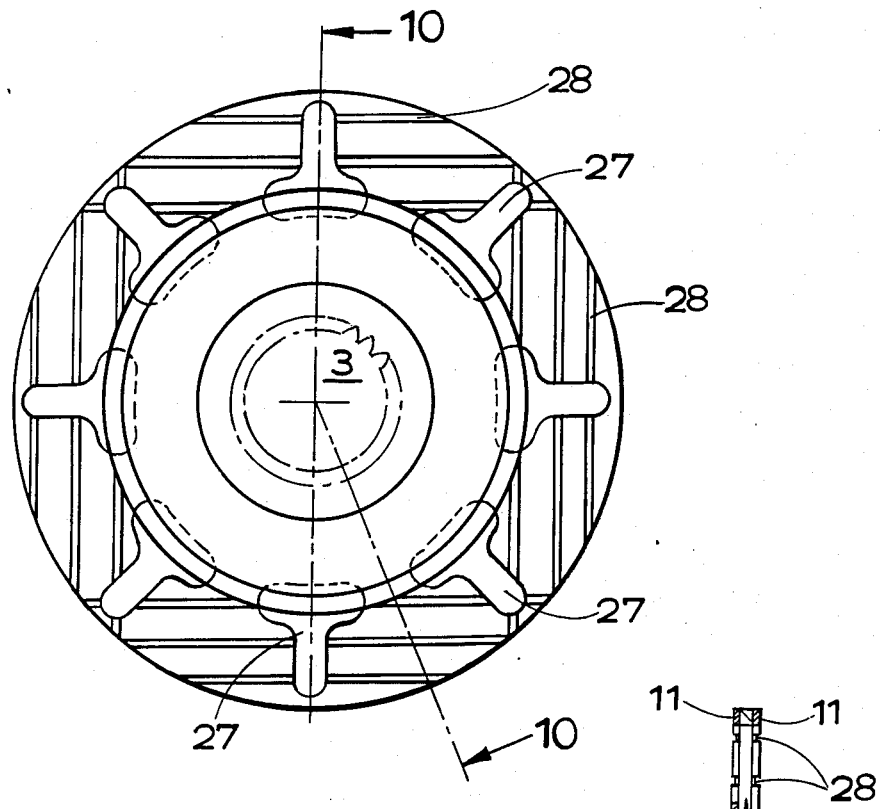
FIG. 9 is an end view of another friction member.
Figure 10:
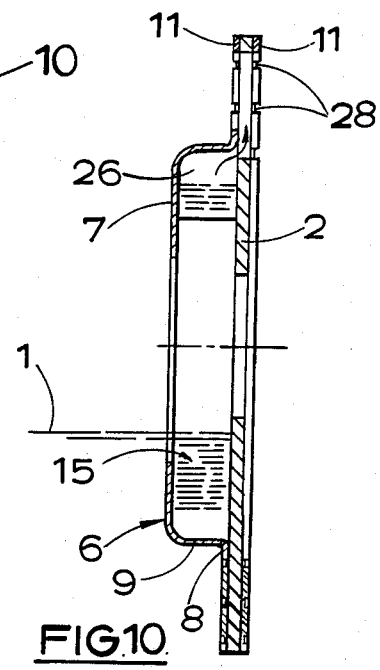
FIG. 10 is a section on the line 10—10 of FIG. 9.

In the friction disc illustrated in FIGS. 9 and 10 of the accompanying drawings the exit ports 10 are omitted, and the disc is provided with a plurality of angularly spaced slots 27, each substantially of Tee-shaped outline, and through which liquid is fed from the reservoir 15 and to the braking faces 4, 5. Specifically the heads of the slots communicate with the reservoir and the stems extend across the braking faces. Liquid is trapped in the slots 27 between the braking faces on opposite sides of the disc, which is lined with linings 11, and flows out through grooves 28 in the linings.

Figure 11:
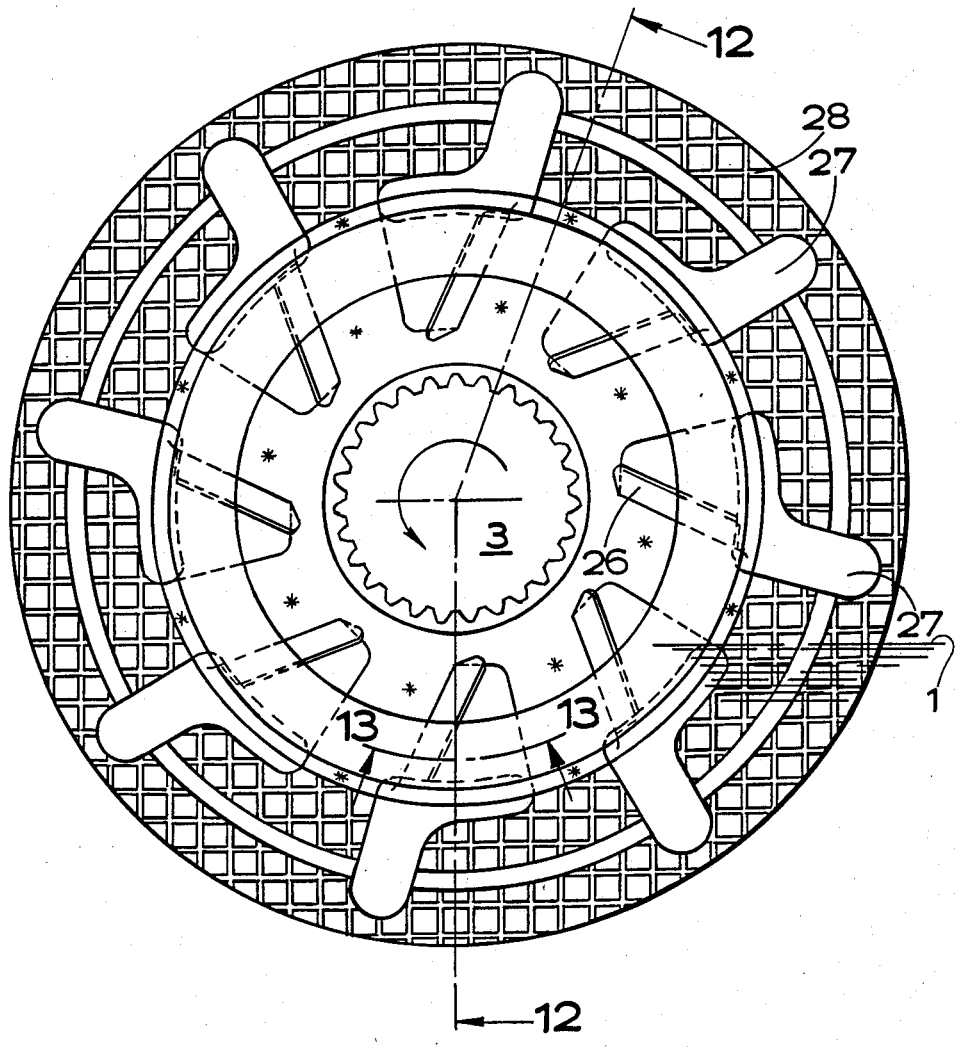
FIG. 11 is an end view of another friction member.
Figure 12:
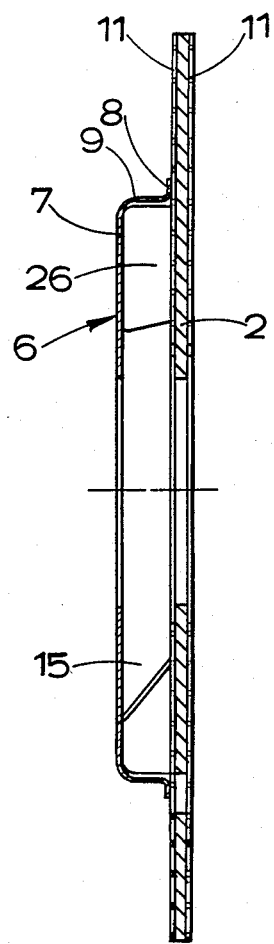
FIG. 12 is a section on the line 12—12 of FIG. 11.
Figure 13:
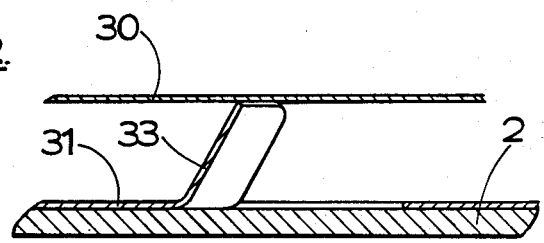
FIG. 13 is a section on the line 13—13 of FIG. 12.

In the disc illustrated in FIGS. 11-13, the baffles 26 are extended radially inwardly of the wall 6 and are inclined with respect to the wall 6 and the disc itself so that the disc acts as an impeller to help fill the reservoir 15. The slots 27 are of L-shaped outline.

The wall 6 and the baffles 26 are constructed from two metal pressings 30, 31. The pressing 31 is generally flat with flaps 33 bent up from it, and the pressing 30, which comprises the wall 6, is of generally dish-shaped outline with the free ends of the flaps 33 engaging the inner face of the wall 6. The pressings 30 and 31 are attached to the disc by any suitable means, for example by welding, the use of tags or by bonding.

Figure 14:
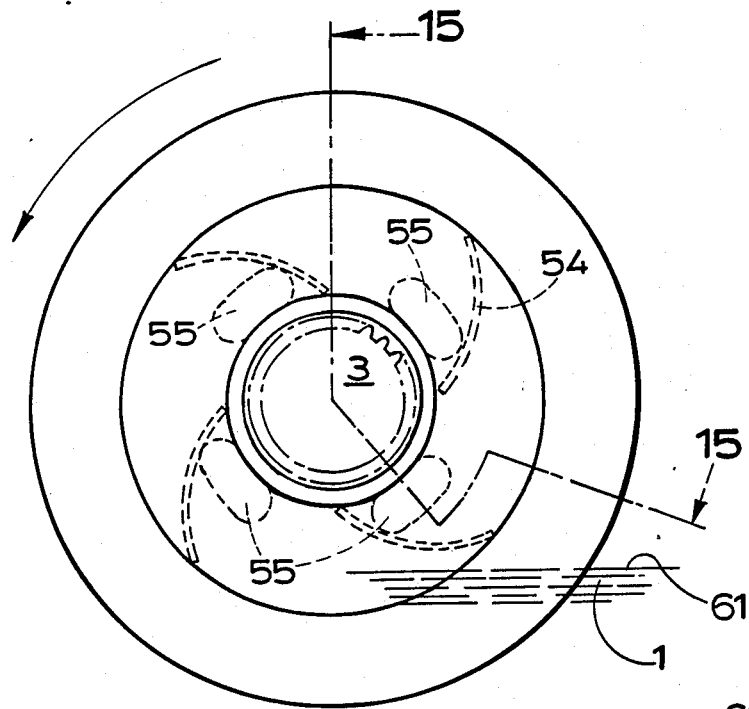
FIG. 14 is an end view of another friction member.
Figure 15:
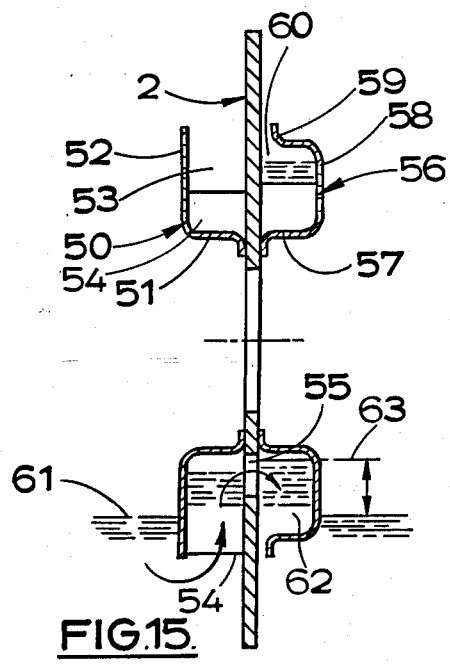
FIG. 15 is a section on the line 15—15 of FIG. 14.

In the friction member illustrated in FIGS. 14 and 15 of the drawings the disc 2 is provided on one side with an annular dish shaped member 50 comprising a cylindrical body part 51 which is secured to the disc 2 surrounding its central opening, and a radial flange 52 which extends outwardly from the outer end of the body 51. An annular chamber 53, which opens outwardly, is defined between the flange 52 and the braking member 2. A plurality of angularly spaced vanes or scoops 54 of arcuate outline extend between the body part 51, the flange 52 and the braking member 2 to raise liquid from the sump 1 when the disc 2 is rotating in a normal forward direction.

A plurality of openings 55, each of which is elongate in a circumferential direction, are provided in the disc adjacent to the inner end of the concave side of each vane 54.

The opposite side of the disc 1, 2 carries an annular member 56 substantially of U or channel outline which is superimposed at its inner end over the member 50. The member 56 has a cylindrical body part 57, from the outer end of which a radial flange 58 extends in an outwards direction, and the flange 58 is cranked at its intermediate point in its length to form a circumferentially extending axial extension 59 which is spaced at its free end from the friction disc 1, 2 to define an annular gap 60 for the escape of liquid.

When the disc is rotating in a normal forward direction, the liquid is raised from the sump at the level 61 by the vanes 54, and passes through the openings 55 into the interior of the member 56 which defines a reservoir 62, and from which it can escape to the braking surfaces through the gap 60.

The vanes 54 raise the liquid from the level 61 to an effective level 63 in the reservoir 62.

In a reverse direction of rotation, substantially no liquid will be raised from the sump 1.

From the foregoing description it will be appreciated that our invention is applicable both to friction member comprising planar metal plates, and to friction members in which the braking faces comprise annular linings of friction material secured to opposite faces of a metal plate.

We claim:

1. A vehicle disc brake of the liquid-cooled type comprising a housing, at least one rotatable friction braking member having a friction surface and being disposed within said housing and slidably keyed to a shaft to be braked, said housing containing cooling liquid for cooling said braking member, means defining a relatively stationary braking surface in said housing, and actuating means for urging said friction surface of said braking member into engagement with said relatively stationary braking surface to apply said brake, wherein said braking member comprises a generally planar plate member having a first radial surface on one side and a second, axially spaced, radial surface on the other side, and a reservoir member secured to said plate member at said first radial surface and disposed to said one side of said plate member, said reservoir member having a region which is axially spaced from said first surface of said plate member and part-defines an annular reservoir for cooling liquid disposed to said one side of said plate member, and wherein passage means are arranged to control the release of liquid from said annular reservoir to the friction surface in response to centrifugal force.

2. A disc brake as claimed in claim 1, wherein said annular reservoir is defined between said plate member and said reservoir member, said reservoir member comprising an annular wall which defines said spaced region and which is secured to said plate member at least at the radially innermost end of said wall.

3. A disc brake as claimed in claim 1, wherein gravity feed supply means is provided to feed liquid to said reservoir, said liquid being urged in use from said gravity feed supply means to said reservoir by gravity.

4. A disc brake as claimed in claim 1, wherein a pump supplies liquid to said reservoir.

5. A disc brake as claimed in claim 4, wherein said pump is separate from said braking member.

6. A disc brake as claimed in claim 4, wherein said pump comprises an impeller constituted at least in part by said braking member itself.

7. A disc brake as claimed in claim 1, wherein said reservoir has an open mouth at the radially innermost end thereof for receiving cooling liquid.

8. A disc brake as claimed in claim 6, wherein said reservoir is closed at the radially innermost end thereof and receives liquid from said impeller through transfer openings provided in said plate member.

9. A disc brake as claimed in claim 2, wherein said passage means comprise angularly spaced exit slots at the radially outermost end of said annular reservoir.

10. A disc brake as claimed in claim 9, wherein said slots are disposed in said wall adjacent to said friction surface.

11. A disc brake as claimed in claim 9, wherein said slots are provided in the thickness of the material of said braking member itself with inner ends of said slots extending into the axially spaced region of said reservoir member.

12. A disc brake as claimed in claim 1, wherein said annular reservoir is provided with angularly spaced baffles which scoop cooling liquid from said sump into a reservoir.

13. A disc brake as claimed in claim 12, wherein said baffles extend between said region and said plate member.

14. A disc brake as claimed in claim 12, wherein said baffles are straight.

15. A disc brake as claimed in claim 1, wherein said annular reservoir is further disposed inside the plate member adjacent to said friction surface.

16. A disc brake as claimed in claim 2, wherein said region extends substantially parallel to said plate member, and said reservoir member comprises a cranked portion which extends from said spaced region to said plate member and is secured to said plate member.

17. A disc brake as claimed in claim 16, wherein said cranked portion is at the radially outer edge of said spaced region.

18. A disc brake as claimed in claim 16, wherein said cranked portion is at the radially inner edge of said spaced region.

19. A disc brake as claimed in claim 1, wherein said annular reservoir is defined between said plate member and said reservoir member, said reservoir member comprising an annular wall which defines said spaced region and which is integral with said braking member at least at the radially innermost end of said wall.

20. A disc brake as claimed in claim 1, wherein a plurality of said rotatable friction braking members are provided, arranged in side-by-side relationship in a stack, each braking member being provided with a plurality of angularly spaced circumferentially extending slots separated by lands defined between said slots, and wherein jet means is provided for applying a jet of liquid axially against said stack, said braking members having graduated slot: land ratios relative to the axial spacing of the braking member from said jet means so as to provide interrupted jet flow of liquid axially across said stack, the arcuate lengths of said slots being reduced, with consequent increase in the arcuate length of said lands, in respect of said braking members positioned relatively further from said jet means so as to provide a substantially even distribution of liquid across said stack.

21. A vehicle disc brake of the liquid-cooled type comprising a housing, at least one rotatable friction braking member having a friction surface and being disposed within said housing and slidably keyed to a shaft to be braked, said housing containing cooling liquid for cooling said braking member, means defining a relatively stationary braking surface in said housing, and actuating means for urging said friction surface of said braking member into engagement with said relatively stationary braking surface to apply said brake, wherein said braking member comprises a generally planar plate member having a first radial surface on one side and a second, axially spaced, radial surface on the other side, and a reservoir member secured to said plate member at said first radial surface and disposed to said one side of said plate member, said reservoir member having an annular wall which is substantially parallel to the plate member and axially spaced from said first surface of said plate member and a generally axially extending cranked portion which extends from said annular wall to said first surface and is secured to said first surface, said reservoir member and said plate member defining between them an annular reservoir for cooling liquid disposed to said one side of said plate member, and passage means are arranged to control the release of liquid from said annular reservoir to the friction surface in response to centrifugal force.

* * * * *